United States Patent [19] [11] 4,173,356
Ross [45] Nov. 6, 1979

[54] INFLATABLE APPARATUS AND METHODS OF CONSTRUCTING AND UTILIZING SAME

[76] Inventor: Tsuneyo Ross, 22301 Winshall, St. Clair Shores, Mich. 48081

[21] Appl. No.: 455,192

[22] Filed: Mar. 27, 1974

[51] Int. Cl.² .......................................... B60R 21/08
[52] U.S. Cl. .................................................. 280/743
[58] Field of Search .............................. 280/150 AB; 206/DIG. 30; 182/137; 244/147, 148

[56] References Cited
U.S. PATENT DOCUMENTS

| | | | |
|---|---|---|---|
| 2,663,524 | 12/1953 | Smith | 244/148 |
| 3,560,018 | 2/1971 | Goetz | 280/150 AB |
| 3,628,809 | 12/1971 | Cirillo | 280/150 AB |
| 3,640,546 | 2/1972 | Brawn | 280/150 AB |
| 3,690,695 | 9/1972 | Jones | 280/150 AB |
| 3,708,181 | 1/1973 | Mazelsky | 280/150 AB |
| 3,799,578 | 3/1974 | Hamasaki | 280/150 AB |

Primary Examiner—John P. Silverstrim
Attorney, Agent, or Firm—Basile and Weintraub

[57] ABSTRACT

The inflatable apparatus, such as an air bag for a vehicle, includes an inflatable body structure which is folded along predetermined lines into a compact shape and volume when the body structure is collapsed or deflated. The valve means is operably connected to the inflatable body structure to facilitate inflation of the apparatus. The inflatable structure is formed and folded in such a fashion that upon operation of the valve, the body structure inflates in a manner wherein the folds puff up simultaneously effecting an even, smooth inflation of the structure to a very large shape and volume which is much greater than the compact predetermined folded shape and volume. One version of the air bag is utilized for the driver of the vehicle, and a second version of the air bag is utilized to accommodate two passengers simultaneously.

3 Claims, 22 Drawing Figures

INFLATABLE APPARATUS AND METHODS OF CONSTRUCTING AND UTILIZING SAME

The present invention relates to an inflatable apparatus and methods of manufacturing and utilizing same. In particular, the present invention relates to novel air bags which are folded in an accordion-style so that proper air flow characteristics are achieved which are necessary to accomplish the safe and proper release and/or inflation of automobile-mounted air bags.

BACKGROUND OF THE INVENTION

Since the advent of various active and passive restraints recently been developed in connection with automobile safety devices, attention has been focused on several impact cushioning devices, such as the automobile-mounted air bag.

Several important problems and difficulties have been encountered in connection with automobile air bags, especially in view of the fact that a different type of bag is required to accommodate passengers of a vehicle, as opposed to the air bag which accommodates the person or driver behind the steering wheel of a vehicle. However, in both situations, the air bags developed heretofore failed to solve the problems of providing a very compact shape and profile for the bag in its collapsed position, and providing air bags which would achieve proper air flow characteristics which are necessary to safely release such an automobile-mounted air bag.

The present invention, which is described in detail hereinbelow, avoids the pitfalls and drawbacks of the previously-developed inflatable devices, and in addition provides a unique folded air bag which achieves the required air flow characteristics during safe release or inflation thereof.

SUMMARY OF THE INVENTION

The present invention provides an inflatable apparatus which includes an inflatable body structure that is folded in a predetermined fashion into a compact predetermined shape and volume when the inflatable body structure is in a condition of deflation. First means is affixed to and operably interconnected with the inflatable body structure for facilitating the inflation of the inflatable body structure. The inflatable body structure is formed and folded in such a predetermined fashion that the simultaneous aerating of the folds is effected and the structure inflates to a substantially large shape and volume which is much greater than the aforementioned compact predetermined shape and volume.

The present invention also provides a novel method of constructing and utilizing the inflatable apparatus, which method makes use of folding techniques similar to those employed in origami, which is the art or process of Japanese paper folding.

In a first preferred embodiment of the present invention, there is provided a steering wheel mounted bag which is folded into a plurality of adjacent pleats, each pleat consisting of an inverted V and its complement, and each pleat formed by doubling the material over on itself and pressing the resulting inward fold into place.

In a second preferred embodiment of the present invention, there is provided an automobile-mounted passenger bag which accommodates two passengers in the vehicle simultaneously. In this embodiment, the base is folded longitudinally, the side of the passenger bag adjacent the window is tucked inwardly, the nozzle is exposed, and the middle seat edge is pointed outwardly in a tuck position.

BRIEF DESCRIPTION OF THE DRAWINGS

FIG. 9 depicts the apparatus of FIG. 8 in a still further stage of folding wherein two sections have been tucked in.

DETAILED DESCRIPTION OF SOME PREFERRED EMBODIMENTS OF THE PRESENT INVENTION

Figure 1:
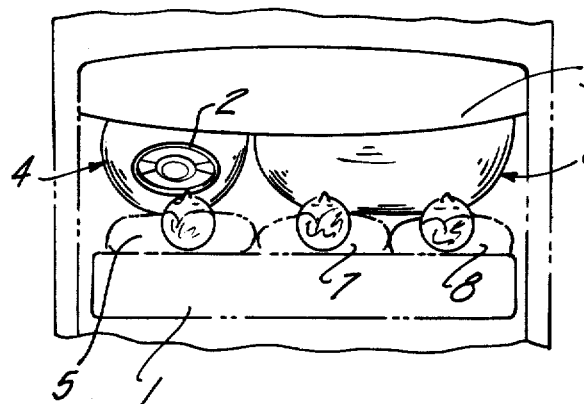
FIG. 1 illustrates a partial top plan view of an automobile showing a first embodiment of the present invention inflated to accommodate the driver of the automobile, and also showing a second embodiment of the present invention inflated to accommodate two passengers seated alongside the driver of the automobile.

With reference to FIG. 1, there is shown the front seat 1, the steering wheel 2, and the dashboard 3 of an automobile. There is further illustrated a first embodiment of the novel inflatable apparatus, or steering wheel bag 4, which is shown fully inflated accommodating and protecting the driver 5. FIG. 1 also depicts a second embodiment of the novel inflatable apparatus, or passenger bag 6, which is depicted in a fully inflated condition simultaneously accommodating and protecting a passenger 7 occupying the middle of the front seat 1, and a passenger 8 occupying a portion of the front seat 1 adjacent the side window of the automobile.

Figure 2:
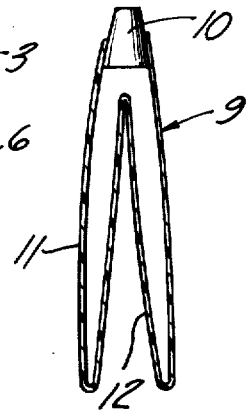
FIG. 2 depicts a sectional view of the first embodiment of the present invention shown in an initial stage of inflation thereof.

Referring to FIG. 2, there is shown the steering wheel bag 4 which comprises an inflatable body structure 9, and first means, such as an air inlet valve or nozzle 10, which is affixed to and operably interconnected with the inflatable body structure 9 to facilitate inflation of the body structure 9.

It should be noted that FIG. 2 is actually a section of the steering wheel bag 4 which has been shown slightly inflated or expanded to illustrate that the inflatable body structure 9 comprises an exterior portion 11 and an interior or in-folded portion 12.

Figure 3:
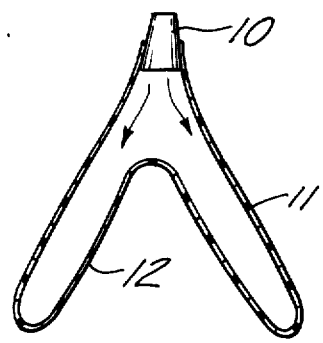
FIG. 3 is another view of the apparatus shown in FIG. 2 but illustrated in a more advanced condition of inflation.
Figure 4:
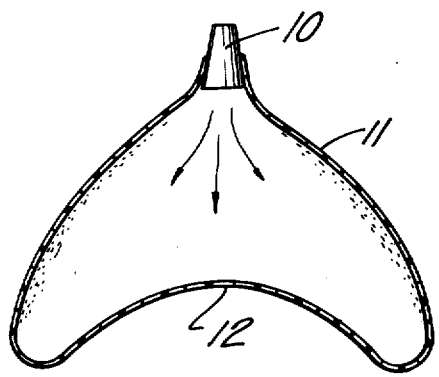
FIG. 4 illustrates the apparatus shown in FIGS. 2 and 3, but in a still more advanced stage of inflation wherein the inner folded portion of the inflatable structure is in the process of being inverted outwardly.
Figure 5:
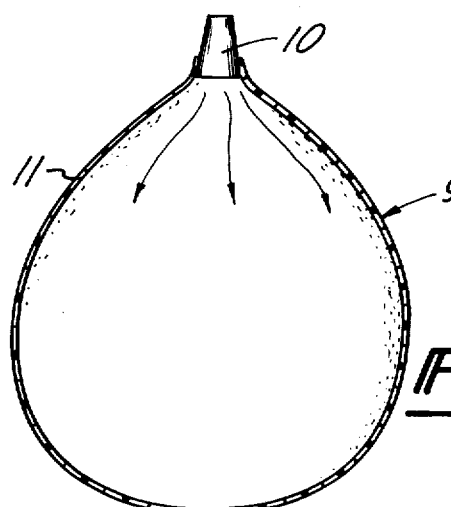
FIG. 5 shows the apparatus of FIGS. 2 through 4 in a fully inflated condition.

FIGS. 3, 4 and 5 show a further progressive sequence of the inflation of the steering wheel bag 4 which is illustrated in FIGS. 1 and 2. The arrows leading into the interior of the inflatable body structure 9 from the air inlet valve or nozzle 10 are merely for the purpose of illustrating the direction of air entry during inflation of the bag 4. In FIG. 3 there is shown that the inflatable bag structure 9 initially inflates to a bifurcated configuration wherein the in-folded portion 12 is being pushed in a direction remote from the air inlet valve 10. FIG. 4 shows the apparatus in a further stage of inflation wherein the in-folded portion 12 is moved still further away from the air inlet valve 10 in a position to where it is inverted to a concave configuration. In FIG. 5 the steering wheel bag 4 is shown in the same fully inflated condition as depicted in FIG. 1. It should be noted how the originally in-folded portion 12 has now been shaped to lie smoothly and continuously with the exterior portion 11.

Figure 6:
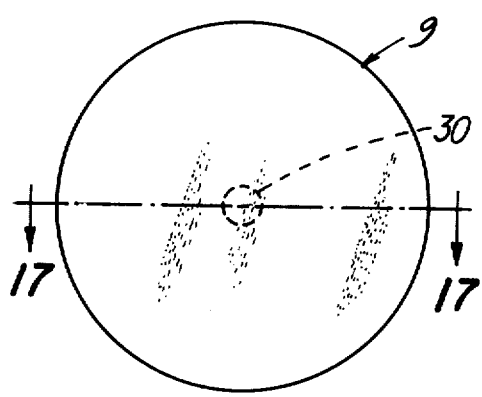
FIG. 6 illustrates a top plan view of the inflatable structure of the first embodiment of the present invention in a deflated unfolded state so that the structure in FIG. 6 is really two thicknesses with the air nozzle means removed as a first stage in illustrating the method of constructing and utilizing this first embodiment of the invention.
Figure 7:
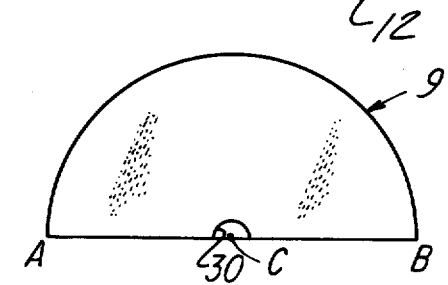
FIG. 7 shows the apparatus of FIG. 6 folded into a semicircular configuration.

FIGS. 6 through 16 illustrate the novel folding techniques and methods of constructing and utilizing the steering wheel bag 4, and also serve to show how the inflatable body structure 9 is folded in a unique predetermined fashion into a compact predetermined shape and volume when the inflatable body structure 9 is in a condition of deflation or collapse. The method of folding can best be seen by using a paper circle to represent the bag as seen in FIG. 6, and by following the steps hereafter indicated. For example, the semicircular configuration shown in FIG. 7 is obtained by folding the circle in FIG. 6 to half itself. It should be understood in FIG. 10 where the body structure is in a deflated and folded condition that although there are really two thicknesses of material when the body is in this state as explained in describing FIG. 6, for the purpose of ease of illustration only one thickness is shown. In addition, these figures serve to illustrate how the steering wheel bag 4 is folded into a plurality of overlapping radial sections or sectors which are disposed in a fan-type arrangement, while at the same time providing proper air flow characteristics necessary to achieve safe release or inflation of the air bag 4.

Figure 8:
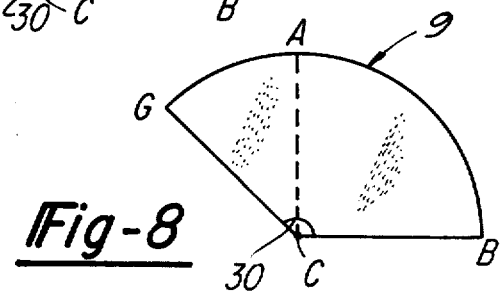
FIG. 8 shows the apparatus of FIG. 7 in a further stage of folding wherein there is a tucked-in section indicated by the dotted line in FIG. 8.

With reference to FIG. 6, there is shown a top plan view of the inflatable body structure 9 depicted in a full substantially circular configuration in a deflated, unfolded state. The bag is laid out flat, two thicknesses, one on top of the other, and is ready to be folded. The nozzle aperture 30 is on the underside at this point. FIG. 7 shows the same structure in FIG. 6 folded over on top of itself forming a semicircular configuration, the nozzle aperature 30 being on the outside of as opposed to inside of the resulting fold. FIG. 8 illustrates the next step in the folding sequence wherein the illustrated top plan view shows a circular sector having an included angle of approximately 135°.

Figure 9:
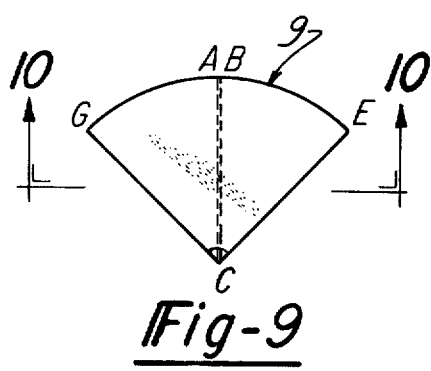
Figure 10:
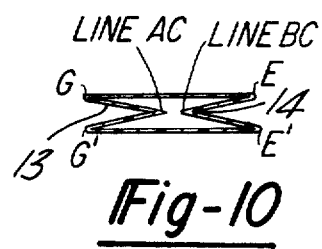
FIG. 10 shows a section of the FIG. 9 apparatus taken along the line 10—10.

The circular sector shown in FIG. 8 is accomplished by bringing the folded line AC in FIG. 7 inward and aligning it vertically as shown by the dotted line AC in FIG. 8. A duplicate inward folding is done along line BC of FIG. 7, resulting in a folded body structure 9 as depicted in FIG. 9. The dotted lines represent the inside folds of AC and BC whose configuration and orientation are best shown in FIG. 10 which forms a section of the FIG. 9 apparatus. FIG. 10 illustrates how the two in-folded sections 13 and 14 are oriented relative to the exterior planar portions of the apparatus.

Figure 11:
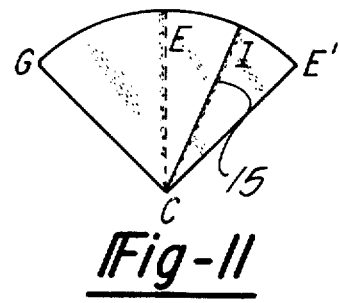
FIG. 11 illustrates the apparatus of FIGS. 9 and 10 in a still more advanced stage of folding.
Figure 12:
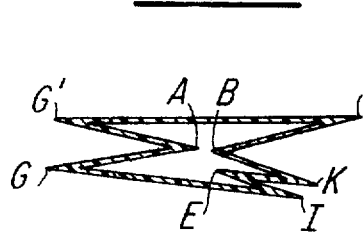
FIG. 12 is a top plan view of FIG. 11.
Figure 13:
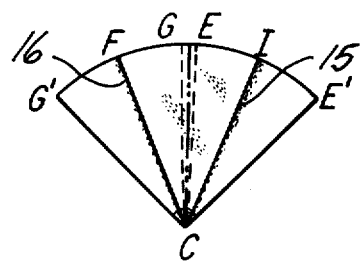
FIG. 13 shows the apparatus of FIGS. 11 and 12 in a still more advanced stage of folding thereof.

FIGS. 11 and 13 illustrate the next step in the folding sequence wherein the fold along the line EC (there being an E'C directly underneath this) is brought inward and aligned vertically as shown by the dotted line EC in FIG. 13. The same inward folding is done with the folds along the lines E'C, GC, and G'C (which lies directly under GC).

Figure 14:
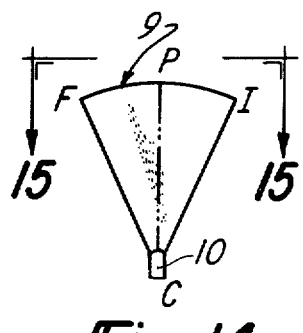
FIG. 14 illustrates the apparatus of FIG. 13 which has been folded into its final compact configuration for mounting in a vehicle in a collapsed storing position.
Figure 15:
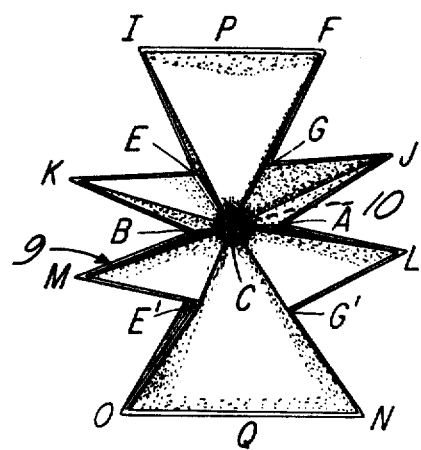
FIG. 15 is a view of the FIG. 14 apparatus taken along the line 15—15 but slightly expanded in order to more clearly illustrate the novel folding technique.

After such a series of folding operations the bag looks like FIG. 14, clearly showing the compact predetermined shape and volume of the inflatable body structure 9 in its collapsed folded condition. In FIG. 15, the apparatus of FIG. 14 has been slightly exploded or expanded along line 15—15 to show the orientation of the various folds of the device. The various folds, the formation of which has been described in detail above, result in a plurality of adjacent accordian pleats which are seen in FIG. 15. Each pleat appears as an inverted V and its complement. For example, one such pleat would consist of the inverted V with its vertex at point M and the complement V with its vertex at the point B. A second pleat consists of the inverted V with its vertex at the point K and its complement with its vertex at the point E.

Figure 16:
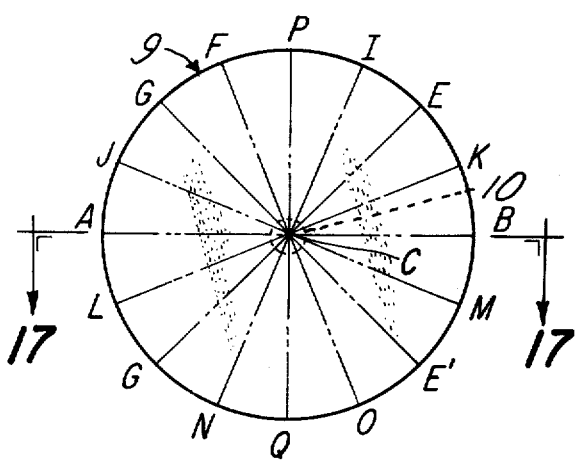
FIG. 16 is a top plan view of the apparatus of FIGS. 14 and 15 including the air nozzle means, but which has been unfolded into a configuration similar to that of FIG. 6 in order to illustrate the unique predetermined fold lines therein.
Figure 17:
FIG. 17 is a section of the FIGS. 6 and 16 apparatus, again in an unfolded and deflated condition taken along the line 17—17.

In FIG. 16 the inflatable body structure 9 has been unfolded deflated to the configuration previously shown in FIG. 6, in order to illustrate the various lines along which the structure 9 has been folded, which is described hereinabove in connection with FIGS. 7 through 15. FIG. 17 is a section of the flattened, deflated device taken along the line 17—17 of FIG. 16 or FIG. 6 to illustrate the orientation of the body structure 9 with relation to the air inlet valve or nozzle 10.

The foregoing detailed description of the present invention has been concerned primarily with a preferred first embodiment comprising a steering wheel bag 4. What follows is a detailed description of a second embodiment of the present invention relating to the passenger bag 6 which is illustrated in FIG. 1 in its fully inflated condition servicing and protecting passengers 7 and 8. The FIGS. 18 through 22 relate to the passenger bag 6 and its unique methods of construction and utilization.

Figure 18:
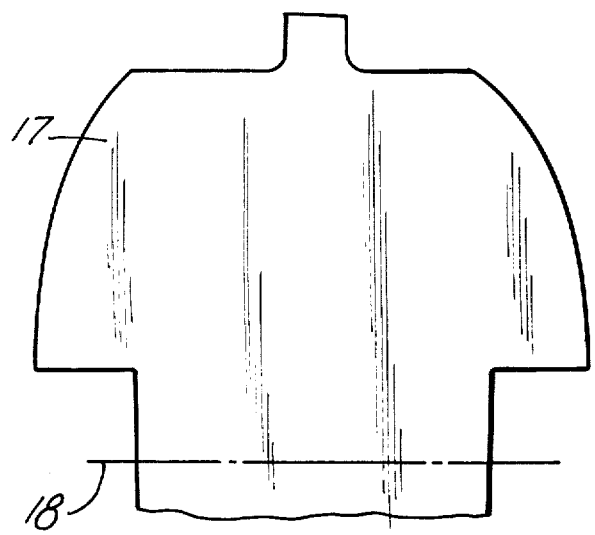
FIG. 18 illustrates a partial top plan view of a blank or pattern from which a second embodiment of the present invention may be fabricated.

With reference to FIG. 18, there is shown a partial top plan view of a blank 17 from which the passenger bag 6 may be fabricated. In FIG. 18 only one half of the blank 17 is shown, and the line designated 18 represents the center line of two such halves. The two halves of the blank 17 will be utilized to fabricate an inflatable body structure 19 of the passenger bag 6. One possible way of accomplishing this is to fold the two halves of the blank or pattern 17 about the center line 18 and using various seaming, molding or other suitable techniques to bind and seal the edges of the two halves of the blank 17. It should be understood that the present invention is not limited to this particular above-mentioned technique for forming the inflatable body structure 19. Rather, the present invention contemplates and embraces various techniques for forming the inflatable body structure 19, including techniques which involve forming the inflatable body structure in one piece or the unitary structure initially.

Figure 20:
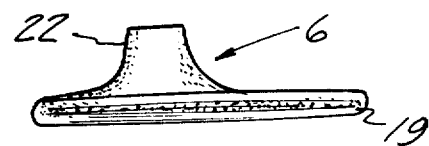
FIG. 20 shows the passenger air bag apparatus in a collapsed condition thereof.
Figure 19:
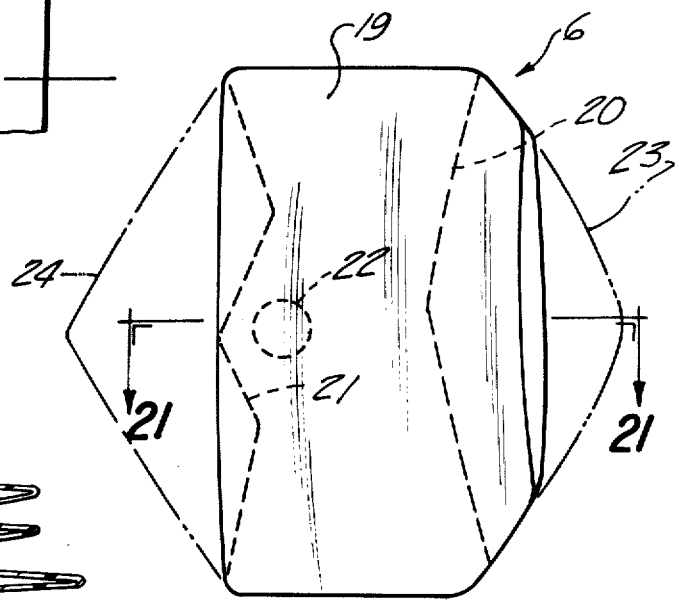
FIG. 19 illustrates the second embodiment of the present invention in a condition prior to full inflation, wherein the outer phantom lines indicate a further stage of inflation thereof.

The solid line configuration shown in FIG. 19 illustrates the passenger bag 6 in a folded condition. FIG. 20 represents a view of the air bag 6 in its collapsed condition. It should be noted at this point that it is possible to fold the passenger bag 6 into other compact shapes and profiles, other than the specific ones depicted in FIGS. 19, 20 and 21. With reference to such figures, it should be noted that the inflatable body structure 19 is folded longitudinally. The side of the inflatable body structure 19 which is adjacent a passengers window is tucked in as represented by the reference numeral 20. It should also be noted that the portion of the body structure 19 adjacent the middle portion of the front seat 1 of the automobile is also tucked in as represented by the reference numeral 21 and is pointing outwardly towards the steering wheel 2 of the automobile. The passenger bag 6 also includes a nozzle or air inlet valve 22 which is exposed on the inflatable body structure 19.

Figure 21:
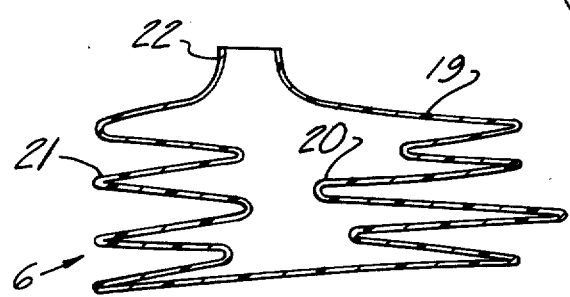
FIG. 21 shows the apparatus of FIG. 19 in a partially inflated or expanded condition.

FIG. 21 shows the passenger bag 6 partially inflated to illustrate the accordion-style folding of the inflatable body structure 19 which aids in achieving the proper air flow characteristics necessary to attain proper and safe inflation and release of the passenger bag 6. Reverting to FIG. 19, it should be noted that as inflation of the passenger bag 6 proceeds, the tucked in window side portion 20 of the inflatable body structure 19 will expand or pop out to the position indicated by the phantom line designated 23. Similarly, as inflation of the passenger bag 6 proceeds, the middle seat portion 21 of the inflatable body structure 19 will expand or pop out to the position indicated by phantom line configuration represented by the reference numeral 24.

Figure 22:
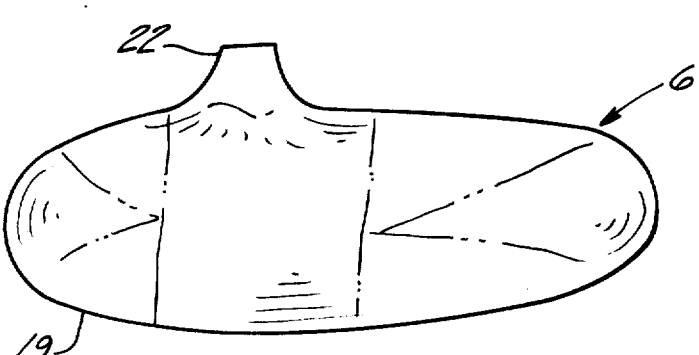
FIG. 22 depicts the apparatus of FIG. 21 but being shown in a fully inflated condition.

FIG. 22 shows the passenger bag 6 in its fully inflated condition, similar to that depicted in FIG. 1, and also serves to indicate the various fold lines along which the inflatable body structure 19 had been folded prior to inflation thereof.

While the foregoing description has been set forth in connection with air bags for an automobile, it should be understood that the present invention relates to and contemplates utilizing the novel inflatable apparatus in connection with other vehicles, and also with any structure wherein it is necessary to provide a structure which can initially be stored in a compact shape and volume, and subsequently be inflated to a substantially large shape and volume which is much greater than the compact shape and volume in the mentioned stored condition. It is manifest that the present invention may be equally utilized in rocket-powered equipment, power boats, airborne vehicles, snowmobiles, etc.

It is obvious that the invention as described hereinabove in connection with two specific embodiments thereof is also capable of numerous variations without departing from the inventive concept. For example, it is possible to modify the passenger bag 6 to accommodate one or any number of persons simultaneously, perhaps even including the driver of the vehicle depending, of course, upon the configuration and structure of the vehicle in question. It is also possible for the inventive concept to be utilized in connection with inflatable apparatus which use variations of the specific origami folding techniques described hereinabove.

The forms of the invention which have been described in detail hereinabove are merely some preferred embodiments, and are not to be considered as limiting the invention to the specific embodiments illustrated. The present invention contemplates and embraces all variations of the invention falling within the scope of the appended claims.

In both embodiments described above, the final stored and collapsed condition of the air bags 4 and 6 are obtained by folding such bags accordion-style so that the air inlet nozzle 10 or 22, respectively, is centrally and symmetrically oriented relative to the accordion-style folds. This central positioning of the nozzle 10 or 22, respectively, permits the air bag 4 or 6 to be inflated with the proper and most effective air flow characteristics.

I claim:

1. A safety bag adapted to be inflated in a vehicle in order to cushion an occupant of the vehicle, said safety bag having a deflated, folded condition and an inflated, unfolded condition, said bag when in said deflated folded condition comprising:
   a plurality of adjacent accordion pleats whose fold lines radiate from a central point of the deflated bag, said fold lines converging at the central point and diverging at the opposite end, such that said pleats are circle-sector shaped, said bag being mounted on said vehicle at said central point.

2. The safety bag described in claim 1 comprising means affixed to and operably interconnected with the safety bag at said central point for facilitating the inflation of the safety bag.

3. A method of folding an inflatable safety bag of generally spherical shape and having a gas inlet orifice, said method comprising: flattening said bag into a circular configuration with said orifice at the center thereof, folding said circular configuration into a semi-circular configuration, folding said circular configuration into a quadrant configuration by inverting the fold of said semi-circular configuration to form two additional folds, all of said folds converging at said center.

* * * * *